(12) United States Patent
Kim et al.

(10) Patent No.: US 9,353,243 B2
(45) Date of Patent: May 31, 2016

(54) LATEX COMPOSITION FOR DIP-FORMING

(71) Applicant: LG CHEM, LTD., Seoul (KR)

(72) Inventors: Jung Eun Kim, Daejeon (KR); Jung Su Han, Daejeon (KR); Seung Uk Yeu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/355,060

(22) PCT Filed: Jan. 15, 2013

(86) PCT No.: PCT/KR2013/000301
§ 371 (c)(1),
(2) Date: Apr. 29, 2014

(87) PCT Pub. No.: WO2013/109033
PCT Pub. Date: Jul. 25, 2013

(65) Prior Publication Data
US 2014/0323634 A1   Oct. 30, 2014

(30) Foreign Application Priority Data

Jan. 18, 2012   (KR) .................. 10-2012-0005493

(51) Int. Cl.
*C08K 3/22* (2006.01)
*C08L 9/04* (2006.01)
*C08F 2/22* (2006.01)
*C08F 236/12* (2006.01)
*B29D 99/00* (2010.01)

(52) U.S. Cl.
CPC ... *C08K 3/22* (2013.01); *C08F 2/22* (2013.01); *C08F 236/12* (2013.01); *C08L 9/04* (2013.01); *B29D 99/0067* (2013.01); *B29K 2995/0077* (2013.01); *C08K 2003/2296* (2013.01)

(58) Field of Classification Search
CPC .............................. C08K 3/22; B29D 99/0067
USPC ........................... 524/432; 525/329.3; 2/168
See application file for complete search history.

(56) References Cited

U.S. PATENT DOCUMENTS

| | | | |
|---|---|---|---|
| 6,566,435 B1 | 5/2003 | Teoh et al. | |
| 7,528,177 B2 * | 5/2009 | Chiang et al. | 516/33 |
| 8,058,339 B2 * | 11/2011 | Taguchi et al. | 524/432 |
| 2010/0152365 A1 | 6/2010 | Han et al. | |

FOREIGN PATENT DOCUMENTS

| | | | |
|---|---|---|---|
| CN | 101293976 A | | 10/2008 |
| CN | 101747542 A | | 6/2010 |
| JP | 05279639 A | * | 10/1993 |
| JP | 1999209523 A | | 8/1999 |
| JP | 2000509421 A | | 7/2000 |
| JP | 2002155167 A | | 5/2002 |
| JP | 2002527632 A | | 8/2002 |
| JP | 2003-246891 A | | 9/2003 |
| JP | 2005-524690 A | | 8/2005 |
| JP | 2008-543732 A | | 12/2008 |
| JP | 2011-162416 A | | 8/2011 |
| JP | 2012180437 A | | 9/2012 |
| KR | 10-2008-0007352 A | | 1/2008 |
| KR | 10-2010-0014945 A | | 2/2010 |
| KR | 10-2010-0069621 A | | 6/2010 |
| WO | 9742017 A1 | | 11/1997 |
| WO | 2013015043 A1 | | 1/2013 |

* cited by examiner

*Primary Examiner* — Vickey Nerangis
(74) *Attorney, Agent, or Firm* — Dentons US LLP

(57) ABSTRACT

Disclosed are a latex composition for dip-forming and a dip-formed nitrile glove produced therefrom which comprise nanoparticulate zinc oxide in a latex for dip-forming, thus advantageously exhibiting superior workability during glove production, having excellent wear sensation due to low modulus at 300%, and not readily tearing in spite of small thickness due to high tensile strength. In addition, the latex composition stably maintains a pH in spite of using a small amount of pH adjuster and thus improves glove production process efficiency.

8 Claims, 1 Drawing Sheet

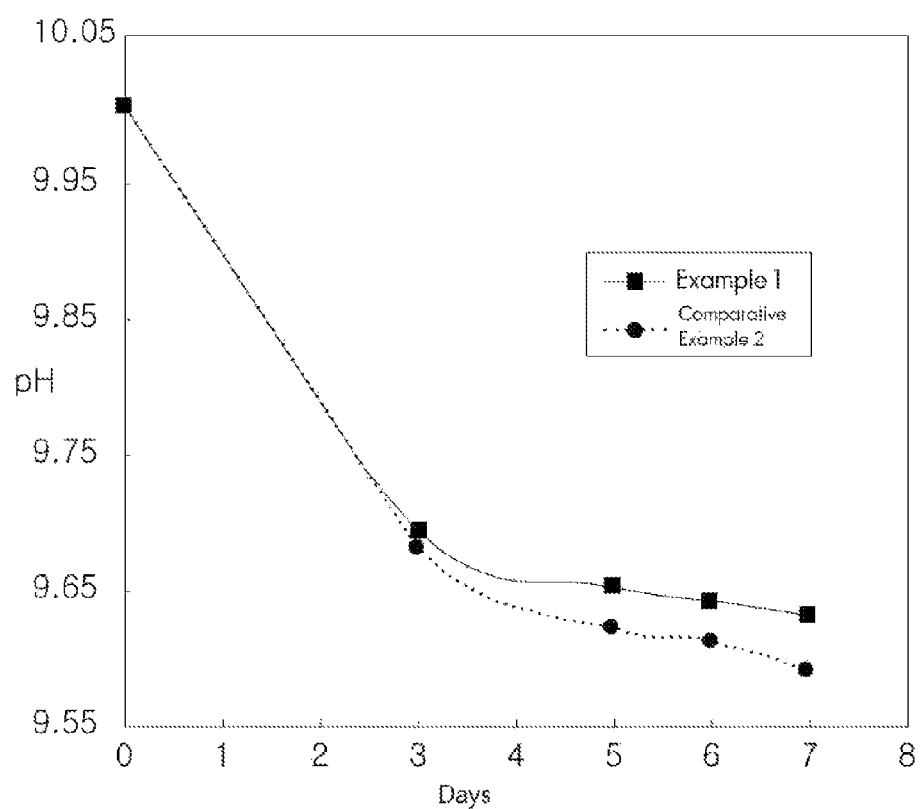

LATEX COMPOSITION FOR DIP-FORMING

This application is a National Stage application of International Application No. PCT/KR2013/000301, filed Jan. 15, 2013, and claims priority to and the benefit of Korean Application No. 10-2012-0005493, filed on Jan. 18, 2012, the disclosures of which are incorporated herein by reference.

TECHNICAL FIELD

The present invention relates to a latex composition for dip-forming and a dip-formed nitrile glove produced therefrom. More specifically, the present invention relates to a latex composition for dip-forming which comprises nanoparticulate zinc oxide, thus advantageously exhibiting superior workability during glove production, having excellent wear sensation due to low modulus at 300%, and not readily tearing in spite of small thickness due to high tensile strength, and a dip-formed nitrile glove produced therefrom.

BACKGROUND ART

Conventionally, natural rubbers have been used as materials for products requiring flexibility such as gloves for industrial, medical and food applications, balloons and condoms. However, nitrile rubbers are rapidly replacing natural rubbers because the natural rubbers cause side effects of serious protein allergies to users. In addition, nitrile rubbers are widely used in gloves used by operators handling organic solvents, medical gloves and food gloves because of superior oil resistance. In addition, nitrile rubber products are suitable for use by medical personnel who handle sharp masses or injection needles because they are not readily perforated by injection needles as compared to natural rubber products.

Recently, many glove manufacturers are changing natural rubber glove production lines into nitrile glove production lines due to unstable supply of natural rubber and nitrile disposable gloves are increasingly used in consideration of safety.

In response to these trends, glove manufacturers aim at producing groves that are slim, but do not readily tear and thus want latexes for dip-forming enabling production of gloves with superior tensile strength.

However, when contents of gels in latexes are increased in order to improve tensile strength, gloves may be stiff upon use due to increase in modulus at 300%.

Accordingly, there is a need for methods for producing globes that do not impair workability upon glove production from compositions for dip-forming, prevent stiffness upon use due to low modulus at 300% and do not readily tear in spite of small thickness due to superior tensile strength.

Meanwhile, a pH adjustor should be further added in order to increase pH because pH at which reaction is finished in the preparation of latex is considerably low. When the pH adjuster is added in a great amount, deodorization should be further performed due to low solid content of latex, thus causing increased latex preparation cost.

In addition, when a composition for dip-forming is prepared for production of gloves, a low concentration of sodium hydroxide, potassium hydroxide or ammonia water is often added as a pH adjuster to the latex to adjust a pH range to a high level of 9 to 11. The pH of the composition for dip-forming affects tensile strength, elongation, texture and the like of produced gloves. The pH of the composition for dip-forming is not maintained and decreased in the process of producing gloves. For this reason, inevitable addition of pH adjuster is inconveniently required.

Adjustment and maintenance of pH in the process of producing latexes are essential factors affecting physical properties of gloves. Production costs can be reduced when pH can be maintained at a predetermined level while minimizing addition of pH adjuster.

DISCLOSURE

Technical Problem

Therefore, the present invention has been made in view of the above problems, and it is one object of the present invention to provide a nitrile latex composition for gloves which exhibits superior workability during glove production, has excellent wear sensation due to low modulus at 300%, and does not readily tear in spite of small thickness due to high tensile strength.

It is another object of the present invention to provide a latex composition for nitrile gloves which stably maintains a pH in spite of using a small amount of pH adjuster and thus improves glove production process efficiency.

The objects of the present invention can be accomplished by the present invention described below.

Technical Solution

In accordance with one aspect of the present invention, provided is a latex composition for dip-forming comprising nanoparticulate zinc oxide.

In accordance with another aspect of the present invention, provided is a dip-formed nitrile glove produced using the latex composition for dip-forming.

According to the present invention, pH of the composition for dip-forming can be stably maintained in spite of using a small amount of pH adjuster, and glove production process efficiency can be thus improved.

BRIEF DESCRIPTION OF THE DRAWINGS

FIG. 1 is a graph showing pH variation of a latex composition for dip-forming according to the present invention.

BEST MODE

In one aspect, the present invention is directed to a latex composition for dip-forming comprising a latex for dip-forming and zinc oxide having a particle diameter less than 1,500 nm.

In addition, the present invention provides a latex composition for dip-forming obtained by adding a vulcanizing agent and a vulcanizing accelerator to the latex composition for dip-forming, and a dip-formed nitrile glove produced using the latex composition for dip-forming.

Hereinafter, the present invention will be described in detail.

The latex composition for dip-forming comprises 100 parts by weight of the latex for dip-forming, and 0.1 to 2 parts by weight of zinc oxide having a particle diameter less than 1,500 nm.

The latex composition for dip-forming of the present invention may comprise 40 to 80% by weight of a conjugated diene monomer, 10 to 50% by weight of an ethylenically unsaturated nitrile monomer, and 0.1 to 10% by weight of an ethylenically unsaturated acid monomer.

Examples of the conjugated diene monomer include 1,3-butadiene, 2,3-dimethyl-1,3-butadiene, 2-ethyl-1,3-butadiene, 1,3-pentadiene and isoprene. The conjugated diene monomer may be used alone or in combination of two or more types. Of these, 1,3-butadiene and isoprene are preferred and, in particular, 1,3-butadiene is more preferred.

The conjugated diene monomer is used in an amount of 40 to 80% by weight, preferably, 45 to 70% by weight, of a monomer mixture. When the amount of used conjugated diene monomer is less than 40% by weight, latex resin-formed articles become hard and are deteriorated in texture. On the other hand, when the amount exceeds 80% by weight, tensile strength of the latex resin-formed articles is deteriorated.

Examples of the ethylenically unsaturated nitrile monomer include acrylonitrile, methacrylonitrile, fumaronitrile, α-chloronitrile, α-cyanoethylacrylonitrile and the like. The ethylenically unsaturated nitrile monomer may be used alone or in combination of two or more types. Of these, acrylonitrile and methacrylonitrile are preferred and acrylonitrile is particularly preferred.

The ethylenically unsaturated nitrile monomer is used in an amount of 10 to 50% by weight, preferably 15 to 45% by weight of the monomer mixture. When the amount of the ethylenically unsaturated nitrile monomer is less than 10% by weight, tensile strength of the latex resin-formed article is deteriorated and when the amount exceeds 50% by weight, latex resin-formed articles become hard and are deteriorated in texture.

The ethylenically unsaturated acid monomer is an ethylenically unsaturated acid monomer containing an acid group such as carboxyl, sulfonic acid or acid anhydride group and examples thereof include ethylenically unsaturated carboxylic acid monomers, such as acrylic acid, methacrylic acid, itaconic acid, maleic acid and fumaric acid; polycarboxylic acid anhydrides, such as maleic anhydride and citraconic anhydride; ethylenically unsaturated sulfonic acid monomers, such as styrenesulfonic acid; and partial ester monomers of ethylenically unsaturated polycarboxylic acids, such as monobutyl fumarate, monobutyl maleate and mono-2-hydroxypropyl maleate. Of these, ethylenically unsaturated carboxylic acid monomer is preferred and methacrylic acid is particularly preferred. The ethylenically unsaturated acid monomer may be used in the form of an alkali metal salt or an ammonium salt. The ethylenically unsaturated acid monomer may be used alone or in combination of two or more types.

The ethylenically unsaturated acid monomer is used in an amount of 0.1 to 10% by weight, preferably 0.5 to 9% by weight, more preferably 2 to 8% by weight, of the monomer mixture. When the amount of the ethylenically unsaturated acid monomer is less than 0.1% by weight, latex resin-formed articles are deteriorated in tensile strength, and when the amount exceeds 10% by weight, latex resin-formed articles become hard and are deteriorated in texture.

Next, a method for preparing the latex for dip-forming will be described.

The latex for dip-forming may be prepared by adding an emulsifier, a polymerization initiator, a molecular weight controller and the like to the monomers, followed by emulsion polymerization.

Examples of the emulsifier include, but are not particularly limited to, anionic surfactants, nonionic surfactants, cationic surfactants and amphoteric surfactants. Of these, the surfactant is particularly preferably an anionic surfactant selected from the group consisting of alkylbenzene sulfonates, aliphatic sulfonates, sulfate esters of higher alcohols, α-olefin sulfonates and alkyl ether sulfate esters. The emulsifier is preferably used in an amount of 0.3 to 10 parts by weight, more preferably 0.8 to 8 parts by weight, and most preferably 1.5 to 6 parts by weight, based on the weight of the monomer mixture constituting the latex.

The kind of the polymerization initiator is not particularly limited. The polymerization initiator is preferably a radical initiator. The radical initiator is selected from the group consisting of: inorganic peroxides, such as sodium persulfate, potassium persulfate, ammonium persulfate, potassium perphosphate and hydrogen peroxide; organic peroxides, such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide and t-butylperoxy isobutyrate; azobisisobutyronitrile; azobis-2,4-dimethylvaleronitrile; azobiscyclohexane carbonitrile; methyl azobisisobutyrate; and mixtures thereof. Of these, inorganic peroxides are more preferred and persulfates are particularly preferred. The polymerization initiator is preferably used in an amount of 0.01 to 2 parts by weight, more preferably 0.02 to 1.5 parts by weight, based on 100 parts by weight in total of the monomer mixture constituting the latex.

An activator is selected from the group consisting of sodium formaldehyde sulfoxylate, sodium ethylenediaminetetraacetate, ferrous sulfate, dextrose, sodium pyrophosphate, sodium sulfite and mixtures thereof.

Examples of the molecular weight modifier include, but are not particularly limited to: α-methylstyrene dimers; mercaptans, such as t-dodecyl mercaptan, n-dodecyl mercaptan and octyl mercaptan; halogenated hydrocarbons, such as carbon tetrachloride, methylene chloride and methylene bromide; and sulfur-containing compounds, such as tetraethylthiuram disulfide, dipentamethylenethiuram disulfide and diisopropylxanthogene disulfide. These molecular weight modifiers may be used alone or in combination of two or more thereof. Of these, mercaptans are preferred. T-dodecyl mercaptan is more preferred. The amount of the molecular weight modifier used may vary depending on the kind thereof. The amount of the molecular weight modifier used is preferably 0.1 to 2.0 parts by weight, more preferably 0.2 to 1.5 parts by weight, most preferably 0.3 to 1.0 parts by weight, with respect to 100 parts by weight in total of the monomer mixture constituting the latex.

If necessary, one or more additives such as chelating agents, dispersants, pH-adjusting agents, oxygen absorbers, particle size modifiers, antioxidants, and oxygen scavengers can be added in the preparation of latex.

There is no particular restriction on how to add the monomer mixture constituting the latex. For example, the monomer mixture may be added to a polymerization reactor in one portion or in successive portions. Alternatively, after a portion of the monomer mixture is added to a polymerization reactor, the remainder is added successively to the polymerization reactor.

A temperature of the emulsion polymerization is not particularly limited and is generally 10 to 90° C., preferably 25 to 75° C. Polymerization conversion when polymerization is stopped is preferably at least 90%, more preferably at least 93%. The latex for dip-forming may be obtained by removing unreacted monomers and adjusting solid content and pH.

The solid content of the latex for dip-forming may be 40 to 50% by weight. An excessively low solid content makes latex transport efficiency low and an excessively high solid content makes viscosity high and causes problems associated with storage stability.

0.1 to 2 parts by weight of nanoparticulate zinc oxide is added to 100 parts by weight of the latex for dip-forming. A particle size of zinc oxide is 50 to 900 nm and zinc oxide should be thoroughly dispersed by a dispersant.

Gloves with high tensile strength can be obtained in spite of using a small amount of nanoparticulate zinc oxide. As particle size of zinc oxide decreases, tensile strength is improved. However, as particle size decreases, dispersion efficiency is deteriorated and stability of the composition for dip-forming may be deteriorated. Accordingly, zinc oxide having a particle size of 50 nm or more is used. When the particle size exceeds 900 nm, an amount of added nanoparticulate zinc oxide should be increased in order to obtain a predetermined level of tensile strength. Accordingly, zinc oxide having a particle size of 900 nm or less is used. In addition, when the particle size of nanoparticulate zinc oxide is excessively large, zinc oxide particles may be disadvantageously precipitated.

A dispersion of nanoparticulate zinc oxide having a pH of 8 or higher is used. When the pH is less than the range defined above, stability of the latex for dip-forming may be deteriorated.

Although the nanoparticulate zinc oxide is used only in an amount of 0.1 to 2% by weight, in particular, 1.0% by weight, a sufficient level of tensile strength can be obtained. When the amount of the nanoparticulate zinc oxide is less than 0.1% by weight, desired level of tensile strength cannot be obtained, and when the amount exceeds 2% by weight, excess zinc oxide is precipitated, stability of the composition may be lowered and gloves may become excessively stiff.

The necessity of adding dispersed zinc oxide by glove manufacturers can be eliminated and precipitation caused by use of zinc oxide can be prevented by previously adding nanoparticulate zinc oxide to the latex for dip-forming.

To prepare a composition for dip-forming, a predetermined amount of pH adjuster is added to the latex for dip-forming to adjust a pH of the composition for dip-forming to 9 to 11. A 1-5% aqueous potassium hydroxide solution or 1-5% ammonia water is generally used as the pH adjuster. Ammonia water is used in a small amount to increase pH, but causes a great decrease in pH of the composition for dip-forming with the passage of time, as compared to the aqueous potassium hydroxide solution.

The composition for dip-forming having a controlled pH may further comprise a vulcanizing agent and a vulcanizing accelerator.

The vulcanizing agent is preferably any vulcanizing agent commonly used for dip-forming, for example, powdery sulfur, precipitated sulfur, colloidal sulfur, surface-treated sulfur, insoluble sulfur and the like. The vulcanizing agent may be preferably used in an amount of 0.1 to 10 parts by weight, more preferably 1 to 5 parts by weight, with respect to 100 parts by weight of the latex solid.

The vulcanizing accelerator is preferably any one of vulcanizing agents commonly used for dip-forming, for example, 2-mercaptobenzothiazole (MBT), 2,2-dithiobis-benzothiozole-2-sulfenamide (MBTS), N-cyclohexyl benzothiasole-2-sufenamide (CBS), 2-orpholinothiobenzothiazole (MBS), tetramethylthiuram monosulfide (TMTM), tetramethylthiuram disulfide (TMTD), zinc diehtyldithiocarbamate (ZDEC), zinc dibutyldithiocarbamate (ZDBC), diphenylguanidine (DPG), di-o-tolyguanidine (DOTG) and the like. The vulcanizing accelerator may be used alone or in combination of two or more types. The vulcanizing accelerator is preferably used in an amount of 0.1 to 10 parts by weight, more preferably 0.5 to 5 parts by weight, with respect to 100 parts by weight of the latex solid.

In addition, the composition for dip-forming may further optionally comprise one or more additives such as pigments, thickeners, chelating agents, dispersants, oxygen absorbers, particle size modifiers, antioxidants, and oxygen scavengers.

Dip-formed articles may be produced by a common dip-forming method using the composition for dip-forming.

Examples of such dip forming method include direct dipping, anode coagulation dipping and Teague's coagulation dipping. Of these, anode coagulation dipping is preferred because dip-formed articles with a uniform thickness can be produced in an easy manner.

Hereinafter, a method for producing a dip-formed article using the latex composition of the present invention will be described in detail.

(a) Immersing Hand-shaped Mold for Dip-forming in Coagulant Solution to Adhere Coagulant to Mold Surface Examples of the coagulant include: metal halides such as barium chloride, calcium chloride, magnesium chloride, zinc chloride and aluminum chloride; nitrates such as barium nitrate, calcium nitrate and zinc nitrate; acetates such as barium acetate, calcium acetate and zinc acetate; and sulfates such as calcium sulfate, magnesium sulfate and aluminum sulfate. Of these, calcium chloride and calcium nitrate are preferred. The coagulant solution is prepared by dissolving the coagulant in water, alcohol or a mixture thereof. The concentration of the coagulant in the coagulant solution is typically 5 to 75% by weight, specifically 15 to 55% by weight.

(b) Dipping Coagulant-adhered Mold in Latex Resin Composition to Form Dip-forming Layer Then, the mold, to which the coagulant is adhered, is dipped in the latex composition for dip-forming prepared from the latex resin composition according to the present invention. The mold is taken out of the latex composition to form a dip-forming layer on the mold.

(c) Heating Dip-forming Layer Formed on the Mold to Crosslink Latex Resin

During the heating, water first evaporates and curing is performed through crosslinking. Then, the dip-forming layer crosslinked by heating is peeled from the mold to obtain a dip-formed article.

(d) Measuring Physical Properties of Obtained Dip-formed Article

A dumbbell-shape specimen was produced from the dip-formed article in accordance with ASTM D-412. Then, the specimen was drawn at an elongation rate of 500 mm/min using a universal testing machine (UTM), tensile strength and elongation at break were measured and texture was determined from stress at an elongation of 300%. As tensile strength and elongation increase, qualities of dip-formed article are improved and as stress at an elongation of 300% decreases, texture of dip-formed articles are improved and qualities are excellent.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims included herein.

EXAMPLE

Example 1

Preparation of Latex for Dip-forming

After a 10 L high-pressure reactor being equipped with a stirrer, a thermometer, a cooler, and an inlet and an outlet of nitrogen gas, and allowing for continuous addition of monomers, an emulsifier and a polymerization initiator was replaced with nitrogen, 2 parts by weight of alkyl benzene sodium sulfonate, 0.5 parts by weight of t-dodecyl mercaptan and 140 parts by weight of ion exchange water were added to 100 parts by weight of a monomer mixture comprising 32% by weight of acrylonitrile, 61.5% by weight of 1,4-butadiene and 6.5% by weight of methacrylic acid, followed by elevating a temperature of the reactor to 40° C. After the temperature elevation, 0.3 parts by weight of potassium persulfate as a polymerization initiator was added to the resulting mixture, and 0.1 parts by weight of sodium dimethyl dithiocarbamate was added thereto when conversion ratio reached 95% to stop polymerization. Unreacted monomers were removed by deodorization, and ammonia water, an antioxidant, a defoaming agent and the like were added to obtain a latex having a solid content of 42% and a pH of 8.0.

0.7 parts by weight of zinc oxide having a particle size of 120 nm was added to 100 parts by weight of the latex, followed by stirring for 2 hours.

Preparation of Composition for Dip-forming

1% by weight of sulfur, 0.5% by weight of ZDBC, a 3% potassium hydroxide solution and a reasonable amount of secondary distilled water were added to the latex to obtain a composition for dip-forming having a solid content of 20% and a pH of 10.0. Equivalents of the potassium hydroxide solution required to elevate the pH to 10 are shown in Table 1. In addition, pH variation of the composition for dip-forming having a pH of 10 is shown in FIG. 1.

Preparation of Composition for Dip-forming

1% by weight of sulfur, 0.5% by weight of ZDBC, a 3% potassium hydroxide solution and a reasonable amount of secondary distilled water were added to the latex to obtain a composition for dip-forming having a solid content of 20% and a pH of 10.0.

Production of Dip-formed Article 22 parts by weight of calcium nitrate, 69.5 parts by weight of water, 8 parts by weight of calcium carbonate and 0.5 parts by weight of a wetting agent (Teric 320 produced by Huntsman Corporation, Australia) were mixed to prepare a coagulant solution. A hand-shaped ceramic mold was dipped in the solution for one minute, and was then taken out and dried at 80° C. for 3 minutes to coat the hand-shaped mold with the coagulant.

Then, the coagulant-coated mold was dipped in the composition for dip-forming for one minute, taken out, dried at 80° C. for one minute and was then dipped in water or warm water for 3 minutes. The mold was dried at 80° C. for 3 minutes again and cross-linked at 125° C. for 20 minutes. The cross-linked dip-forming layer was peeled from the hand-shaped mold to obtain a glove-shaped dip-formed article. Physical properties of the dip-formed article are shown in Table 2.

Example 2

1.0 part by weight of zinc oxide having a particle size of 120 nm was added to the latex produced in the same manner as Example 1, followed by stirring for 2 hours. Other processes were the same as in Example 1.

Comparative Example 1

1.0 part by weight of zinc oxide having a particle size of 1.05 μm was added to the latex produced in the same manner as Example 1, followed by stirring for 2 hours.

Comparative Example 2

Nanoparticulate zinc oxide was not added to the latex produced in the same manner as Example 1. Instead, 1.5 parts by weight of general zinc oxide (particle size of 1.5 to 2.0 μm) was added during addition of sulfur.

Test Example

A dumbbell-shape specimen was produced from the obtained dip-formed article in accordance with ASTM D-412. Then, the specimen was drawn at an elongation rate of 500 mm/min using a universal testing machine (UTM), tensile strength and elongation at break were measured, and stress at an elongation of 300% and stress at an elongation of 500% were measured. Results are shown in the following Table 2.

Stirred latex was allowed to stand for 3 days without stirring and whether or not a precipitate was formed in the latex was observed. Presence of precipitates in latexes for dip-forming of Examples 1 and 2 and latexes of Comparative Examples 1 and 2 are shown in Table 2. Presence of precipitate is represented by "C)" and absence of precipitate is represented by "X".

After the dumbbell-shape specimen was stored at 100° C. in an oven for 22 hours, physical properties of the specimen were measured in the same manner as above to obtain physical properties after aging. Results are shown in the following Table 3.

TABLE 1

| Equivalents of KOH required to adjust pH of composition for dip-forming to 10 | |
|---|---|
| Example 1 | Comparative Example 2 |
| Nano-zinc oxide + KOH 1.53 | General zinc oxide + KOH 2.36 |

TABLE 2

| | Tensile strength (MPa) | Elongation (%) | Stress at 300% (MPa) | Stress at 500% (MPa) | Precipitation |
|---|---|---|---|---|---|
| Example 1 | 39.8 | 603 | 5.45 | 16.9 | X |
| Example 2 | 43.4 | 587 | 6.29 | 21.7 | X |
| Comparative Example 1 | — | — | — | — | ○ |
| Comparative Example 2 | 41.8 | 555 | 7.80 | 29.7 | ○ |

TABLE 3

| | Tensile strength (MPa) | Elongation (%) | Stress at 300% (MPa) | Stress at 500% (MPa) |
|---|---|---|---|---|
| Example 1 | 37.1 | 572 | 6.15 | 21.1 |
| Example 2 | 40.6 | 563 | 6.70 | 25.1 |
| Comparative Example 2 | 38.0 | 514 | 9.08 | 34.5 |

As can be seen from results of the tables above, dip-formed articles of Examples 1 and 2 using the latex for dip-forming containing nanoparticulate zinc oxide having a particle size of 50 to 900 nm are excellent in physical properties such as tensile strength, elongation and stress as compared to the latex for dip-forming containing no nanoparticulate zinc oxide. In addition, nanoparticulate zinc oxide decreases an amount of pH adjuster used to increase the pH of the composition for dip-forming. As can be seen from FIG. 1, the composition for dip-forming of Example 1 exhibits a less pH decrease and enables more stable glove production at a lower cost, as compared to Comparative Example 2.

INDUSTRIAL APPLICABILITY

As apparent from the fore-going, the present invention advantageously provides a composition for dip-forming which exhibits superior workability during glove production, has excellent wear sensation due to low modulus at 300%, and does not readily tear in spite of small thickness due to high tensile strength.

The composition for dip-forming stably maintains a pH in spite of using a small amount of pH adjuster and thus improves glove production process efficiency.

What is claimed is:

1. A latex composition for dip-forming comprising:
   a latex for dip-forming; and
   an aqueous potassium hydroxide solution together with a zinc oxide as a pH adjuster,
   wherein the zinc oxide has a particle diameter of 120 to 900 nm,
   wherein the zinc oxide is dispersed in the latex composition, and a pH of the latex composition is 8 or higher,
   wherein the zinc oxide is present in an amount of 0.7 to 1.0 parts by weight with respect to 100 parts by weight of the latex, and
   wherein the latex comprises 55 to 61.5% by weight of a conjugated diene monomer, 32 to 37% by weight of an ethylenically unsaturated nitrile monomer, and 6.5 to 8% by weight of an enicethylenically unsaturated acid monomer.

2. The latex composition according to claim 1, wherein the conjugated diene monomer comprises at least one selected from the group consisting of 1,3-butadine,2,3-dimethyl-1,3-butadinene, 2-ethyl-1,3-butadine, 1,3-pentadiene and isoprene.

3. The latex composition according to claim 1, wherein the ethylennically unsaturated nitrile monomer comprises at least one selected from the group consisting of acylonitrile, methacrylonitrile, fumaronitrile, α-chloronitrile, and α-cyanoethylacrylonitrile.

4. The latex composition according to claim 1, wherein the ethylenically unsaturated acid monomer comprises at least one selected from the group consisting of acrylic acid, methacrylic acid, itaconic acid, maleic acid, fumaric acid, maleic anhydride, citraconic anhydride, styrenesulfonic acid, monobutyl fumarate, monobutyl maleate and mono-2-hydroxypropyl maleate.

5. The latex composition according to claim 1, further comprising a vulcanizing agent and a vulcanizing accelerator.

6. The latex composition according to claim 5, wherein the vulcanizing agent is present in an amount of 0.01 to 10 part by weight, with respect to 100 parts by weight of the latex for dip-forming,
   wherein vulcanizing agent is selected from the group consisting of powdery sulfur, Precipitated sulfur, colloidal sulfur, surface-treated sulfur, and insoluble sulfur.

7. The latex composition according to claim 5, wherein the vulcanizing accelerator is present in an amount of 0.1 to 10 parts by weight, with respect to 100parts by weight of the latex for dip-forming,
   wherein the vulcanizing accelerator is selected from the group consisting of MBT(2-mercaptobenzothiazole), MBTS(2,2-dithiobisbenzothiozole-2-sulfenamide), CBS(N -cyclohexylbenzothiasole-2-sulfenamide), MBS (2-orpholinothiobenzothiazole), TMTM(tetramethylthiuram monosulfide), TMTD(tetramethylthiuram disulfide), ZDEC (zinc diethyldithiocarbamate), ZDBC (zinc dibutyldithiocarbamate), DPG(diphenylguanidine), and DOTG(di-o-tolylguanidine).

8. A dip-formed nitrile glove produce from the latex composition for dip-forming according to claim 5.

* * * * *